(12) United States Patent
Korczynski et al.

(10) Patent No.: US 7,878,822 B2
(45) Date of Patent: Feb. 1, 2011

(54) SEALED COMPACT POWER DISTRIBUTION MODULE

(75) Inventors: Jacek M. Korczynski, Niles, IL (US);
Kerri M. Moore, Schaumburg, IL (US);
Eric D. Ude, Cortland, OH (US);
Richard E. Kriss, Chicago, IL (US);
Frank Maine, Marana, AZ (US)

(73) Assignee: Cooper Technologies Company, Houston, TX (US)

( * ) Notice: Subject to any disclaimer, the term of this patent is extended or adjusted under 35 U.S.C. 154(b) by 205 days.

(21) Appl. No.: 11/784,871

(22) Filed: Apr. 10, 2007

(65) Prior Publication Data

US 2007/0270045 A1 Nov. 22, 2007

Related U.S. Application Data

(63) Continuation-in-part of application No. 11/010,229, filed on Dec. 10, 2004, now Pat. No. 7,396,262.

(51) Int. Cl.
*H01R 12/00* (2006.01)
(52) U.S. Cl. .................. 439/76.2; 439/718; 439/271; 220/326
(58) Field of Classification Search ............ 439/723, 439/718, 620.27, 76.2, 76.1, 271, 272, 281; 220/326, 788, 784, 4.02; 174/50, 58
See application file for complete search history.

(56) References Cited

U.S. PATENT DOCUMENTS

| | | | | |
|---|---|---|---|---|
| 2,684,779 A | * | 7/1954 | Rafferty | 220/298 |
| 4,182,519 A | * | 1/1980 | Wilson | 277/616 |
| 4,444,331 A | * | 4/1984 | Lankston | 220/304 |
| 4,959,018 A | * | 9/1990 | Yamamoto et al. | 439/76.1 |
| 5,280,135 A | | 1/1994 | Berlin et al. | 174/67 |
| 5,373,104 A | * | 12/1994 | Brauer | 174/562 |
| 5,478,244 A | * | 12/1995 | Maue et al. | 439/76.2 |
| 5,628,533 A | * | 5/1997 | Hill | 292/80 |
| 5,668,698 A | * | 9/1997 | Jozwiak et al. | 361/752 |
| 5,752,856 A | | 5/1998 | Boutin et al. | 439/620.29 |
| 5,777,843 A | | 7/1998 | Younce | 361/641 |
| 5,788,529 A | * | 8/1998 | Borzi et al. | 439/364 |
| 6,227,913 B1 | | 5/2001 | Davis et al. | 439/620.26 |
| 6,431,880 B1 | | 8/2002 | Davis et al. | 439/76.2 |
| 6,464,522 B2 | | 10/2002 | Osawa et al. | 439/271 |

(Continued)

OTHER PUBLICATIONS

Press Release: Cooper Bussmann Automotive Products Adds Dual Vehicle Electrical Center (DVEC) with Programmable Power Distribution to Product Line, Jun. 2003 (3 pages).

(Continued)

*Primary Examiner*—Xuong M Chung Trans
(74) *Attorney, Agent, or Firm*—Armstrong Teasdale LLP

(57) ABSTRACT

A sealed power distribution module includes a nonconductive body defining a terminal receptacle, a barrier seal engaged to and surrounding the body adjacent the receptacle on an exterior surface of the body, a terminal element grid fitted within the receptacle, and provisions for installing commercially available sealed terminals to complete the wiring. The grid is engaged to the body at a location interior to the barrier seal. The power distribution module may also include one or more bus bar assemblies oriented such that simultaneous switching of relay packages is possible.

24 Claims, 11 Drawing Sheets

U.S. PATENT DOCUMENTS 6,969,285 B2    11/2005  Kobayashi .................. 439/723
7,072,188 B2 *   7/2006  Janisch ....................... 361/826
7,413,479 B1 *   8/2008  Volpone ...................... 439/692

OTHER PUBLICATIONS

The TRA Fuse Block Modular Rear Terminal ATC Fuse Block Series 15710 available at http://www.busscc.com.uk/new_products.htm.

* cited by examiner

SEALED COMPACT POWER DISTRIBUTION MODULE

CROSS-REFERENCE TO RELATED APPLICATION

This application is a continuation-in-part application of U.S. Ser. No. 11/010,229 filed Dec. 10, 2004, entitled "Sealed Compact Power Distribution Module," by Jacek Korczynski et al., now issue U.S. Pat. No. 7,396,262, the disclosure of which is hereby incorporated by reference.

BACKGROUND OF THE INVENTION

This invention relates generally to power distribution blocks or terminal blocks and, more particularly, to power distribution blocks for vehicle electrical systems.

Fuses are widely used for overcurrent protection to prevent damage to electrical circuits. Fuse terminals typically form an electrical connection between an electrical power source and an electrical component or a combination of components arranged in an electrical circuit. One or more fusible links or elements, or a fuse element assembly, is connected between the fuse terminals, so that when electrical current through the fuse exceeds a predetermined limit, the fusible elements melt and opens one or more circuits through the fuse to prevent component damage.

Power distribution blocks and terminal blocks are often utilized to collect a plurality of fuses in a central location in an electrical system. Conventionally, fuse blocks include individually wired circuits within the block for power input. As such, when it is desired to power more than one circuit with the same power source, a jumper is installed for this purpose. Installation of jumpers, however, is costly, labor intensive, and time consuming. Added circuits also require the use of larger gauge wiring in order to handle the additional current load. Thus, accommodation of additional loads and auxiliary circuits with conventional fuse blocks used in, for example, vehicle electrical systems, is difficult. Electrical systems of many vehicles now include expanded electrical systems to accommodate additional vehicle features and entertainment devices. Some vehicles, for example, watercraft, buses, and recreational vehicles, include separately powered auxiliary loads for such purposes, and wiring these loads to auxiliary power sources adds to the complexity and difficulty of wiring the electrical system of the vehicle.

At least some existing fuse blocks are configured for plug-in connection to circuitry to avoid labor intensive hard-wired connections. Connections in such fuse blocks are made to one or more internal buses to selectively distribute electrical power to, for example, different electrical subsystems of a vehicle. The use of a second internal bus allows a user to switch a bank of relays at the same time. Such fuse blocks, however, are commonly used with switching elements which must be separately wired from the fuse block so power can be selectively switched to certain components or circuits in the electrical system. Additionally, switching elements permit convenient disconnection of associated circuits from the power source during maintenance procedures, and avoid a need to remove and reinstall fuses in vehicle environments where access is often restrictive.

Power distribution blocks are known which may accommodate fuse, circuit breakers, and relay switches in a single package, and thus provide both overcurrent protection and convenient switching of power in a single package. One such power distribution block, sometimes referred to as a vehicle electrical center (VEC) is commercially available from Cooper/Bussmann. For example, some specialty vehicles, construction and agricultural equipment, marine applications, and truck, bus, and RV applications do not require the sophistication of the VEC or justify the cost of such distribution blocks.

Additionally, specialty vehicles, construction and agricultural equipment, marine applications, and truck, bus, and RV applications may include moisture, vibration, and contaminant issues in use that are not experienced with conventional fuse blocks or power distribution blocks for automotive applications. Thus, conventional fuse blocks and power distribution are poorly suited for certain applications.

BRIEF DESCRIPTION OF THE INVENTION

According to an exemplary embodiment, a power distribution module comprises a nonconductive body defining a terminal receptacle, a barrier seal engaged to and surrounding the body adjacent the receptacle on an exterior surface of the body, and a terminal element grid fitted within the receptacle. The grid is engaged to the body at a location interior to the barrier seal.

According to another exemplary embodiment, a power distribution module comprises a nonconductive body defining a terminal receptacle, a cover latch projection, and support buttresses flanking the latch projection. A barrier seal is engaged to and surrounds the body adjacent the receptacle on an exterior surface of the body. A protective cover is configured to enclose the terminal receptacle, and the cover comprises a sealing rim which is received between the support buttresses and an outer surface of the terminal receptacle. The buttresses prevent warping of the cover and compromising the integrity of the barrier seal.

According to yet another exemplary embodiment, a power distribution module comprises a nonconductive body defining a terminal receptacle, at least one bus bar assembly situated within the terminal receptacle, a barrier seal engaged to and surrounding the body adjacent the receptacle on an exterior surface of the body, and a protective cover configured to compress the barrier seal around a periphery of the terminal receptacle.

BRIEF DESCRIPTION OF THE DRAWINGS

FIG. 14 illustrates an exemplary base for a rear terminal mini fuse and relay panel.

DETAILED DESCRIPTION OF THE INVENTION

Figure 1:
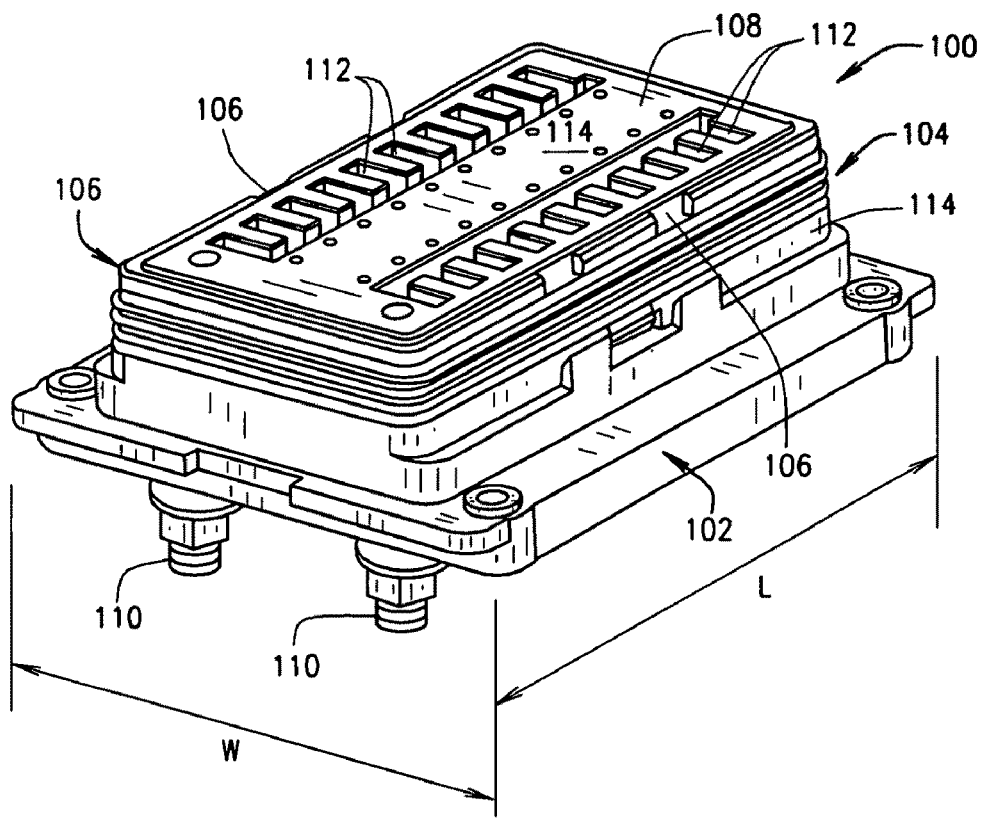
FIG. 1 illustrates an exemplary power distribution module.

FIG. 1 illustrates an exemplary power distribution module 100 in the form of a overcurrent protection block which is adapted for use in a wide range of vehicles in an economical manner and with a compact configuration. As such, the power distribution module 100 is well suited for use in, for example, specialty vehicles including construction and agricultural equipment, marine vessels and watercraft, trucks, buses, and recreational vehicles to name a few. The power distribution module 100 is provided in a compact size while providing a high component density for primary or secondary or auxiliary power distribution within an electrical system. The module 100 may be provided at relatively low cost while facilitating convenient connection to external circuitry without labor intensive hard-wired connections, and the module 100 may be suitably sealed with to withstand moisture, contaminant exposure, and vibration in use. Additionally, the module 100 may be surface mounted or panel mounted for flexible installation to vehicles. While the invention is described in the context of specialty vehicles, construction and agricultural equipment, marine vessels and watercraft, trucks, buses, and recreational vehicles, the invention is not intended to be limited to such exemplary applications.

In an exemplary embodiment, the power distribution module 100 includes a nonconductive housing base or body 102, a barrier seal 104, a nonconductive terminal element tray or grid 106 coupled to the body 102, and a grid guide cover 108 overlying the grid 106. A pair of power input or line-side input terminals 110 extend from the body 102 and are connected, respectively, to internal buses (not shown in FIG. 1 but described below) within the housing 102. In an exemplary embodiment, the line-side input terminals 110 are threaded terminal studs for increased current capacity relative to other types of terminals. It is understood, however, that other types of line-side input terminals may be employed in alternative embodiments of the invention in lieu of terminal studs.

The grid 106 and the grid guide cover 108 each include a number of overcurrent device openings or apertures 112 extending therethrough, and each of the openings 112 is dimensioned to receive an overcurrent protection device (not shown) therein. As illustrated in FIG. 1, the openings 112 are aligned in rows and columns on a top surface 114 of the grid guide cover 108. In an exemplary embodiment, the grid 106 and the guide cover 108 include twenty openings 112 divided into two groups or sets of ten openings each, and the groups of openings 112 extend generally parallel to one another on the top surface 114 of the module 100. It is understood however, that a greater or lesser number of overcurrent device openings 112 could be provided in another embodiment, and the overcurrent device openings 112 could be arranged on the top surface 114 differently than FIG. 1 illustrates. In an exemplary embodiment, the power distribution module 100 has a length L of approximately 113 mm and a width W of approximately 85 mm while including twenty overcurrent device openings 112, therefore accommodating a dense population of overcurrent protection devices in a compact size. It is contemplated, however, that the dimensions of the module 100 may vary in alternative embodiments.

Terminal elements (not shown in FIG. 1 but described below) are situated within the body 102 and the grid 106 proximate each of the overcurrent device openings 112, and the terminal elements are connected to the buses in the body to establish electrical connection to the line-side input terminals 110. Thus, when overcurrent protection devices such as fuses are inserted into the openings 112 and engaged to the terminal elements, electrical connections are completed between the line-side input terminals 110 and the respective overcurrent protection devices. Power output or load side-connections to the overcurrent protection devices may be established using known connectors to connect load-side equipment to the power distribution module 100 as further described below.

A protective cover (not shown in FIG. 1) but described below, is detachably mounted to the body 102 over the grid 106 and the grid guide cover 108 to form a protective enclosure for the overcurrent protection devices once installed to the module 100. The protective cover cooperates with the sealing barrier 104 to provide a moisture-proof seal to protect the overcurrent protection devices and the grid 106 in use and to prevent contaminants from entering the module 100. Additionally, the protective cover securely latches to the module body 102 as described below and may more capably withstand vibration and extreme operating environments than known power distribution modules.

Figure 2:
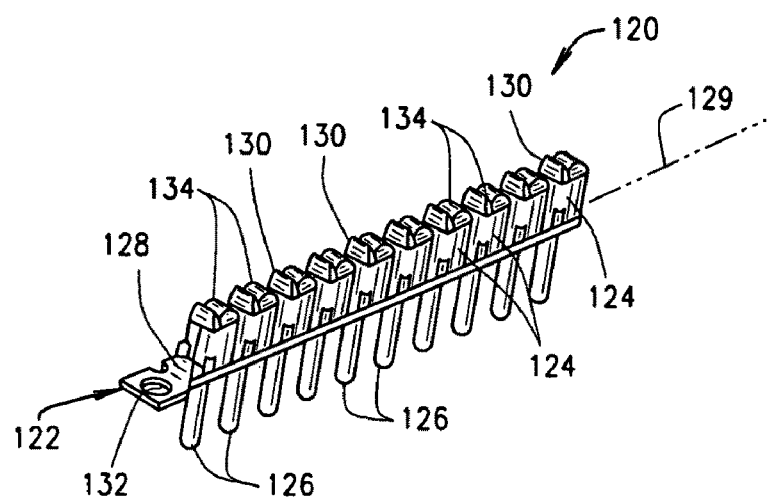
FIG. 2 illustrates an exemplary bus bar assembly for the power distribution module shown in FIG. 1.

FIG. 2 illustrates an exemplary fuse bus bar assembly 120 for the power distribution module 100 (shown in FIG. 1). The fuse bus bar assembly includes a conductive bus bar 122, terminal elements 124, and locating pins 126. The bus bar 122 includes a flat or generally planar region 128, and the region 128 is elongated and extends along a longitudinal axis 129 of the bus bar 122. The locating pins 126 include upstanding contact blades 130, and the pins 126 are press fit and soldered to the bus bar 122 so that the contact blades 130 extend along the axis 129 of the bus bar 122 and extend substantially perpendicular to the planar region 128 and above a top surface of the planar region 128. An aperture 132 is formed in the bus bar 122 at one end of the planar region 128, and the aperture 132 receives one of the input terminals 110 (shown in FIG. 1) to mechanically and electrically connect the input terminal 110 to the bus bar 122. The bus bar 122 is integrally fabricated and formed from a single piece of conductive material in an exemplary embodiment according to a known stamping and forming process, although other fabrication processes familiar to those in the art may be utilized. When the terminal elements 124 are received on the contact blades 130, the terminal elements are connected to the input terminal 110 via the bus bar 122. The terminal elements 124 provide contact pressure between the contact blades 130 and terminal elements of plug-in devices (e.g., fuses and switching elements).

In an exemplary embodiment, the terminal elements 124 are known resilient or spring terminals which engage the upstanding contact blades 130 of pins 124 and receive a power input or line-side terminal blade of a fuse. The terminal elements 124 each include a resilient or deflectable contact arm 134 in an exemplary embodiment, and when the line-side terminal blade of a fuse is inserted between the contact arms 134 and the respective contact blade 130 of the bus bar 122, the contact arm 134 clamps the terminal blade of the fuse to the contact blade 130 of the bus bar 122. The terminal elements 124 are fabricated from a sheet of conductive material in an illustrative embodiment according to a known stamping and forming process, or other fabrication processes familiar to those in the art. In alternative embodiments, the terminal elements 124 may be fabricated from nonconductive materials if desired. It is understood that the terminal elements 124 could be formed into a variety of shapes using a variety of materials in various alternative embodiments.

In one embodiment, the contact blades 130 of the bus bar 122 and the attached terminal elements 124 are uniformly spaced from one another and configured to accept, for example, 2.80 mm wide terminal blades of known ATM style automotive fuses which are commercially available from, for example, Cooper/Bussmann of St. Louis Mo. Thus, the bus bar assembly 120 is particularly well suited for fuses commonly used in vehicle applications. It is understood, however, that the contact blades 130 and the terminal elements 124 could be otherwise constructed to accept other types of fuses, and also other types of overcurrent protection devices such as circuit breakers, as desired. Additionally, while the illustrative bus bar assembly 120 of FIG. 2 includes ten contact blades 130 and ten terminal elements 124, it is appreciated that greater or fewer numbers of contact blades 130 and terminal elements 124 may be employed in alternative embodiments.

The location pins 126 extend downwardly from the planar region 128 of the bus bar 122, and the location pins 126 are received in the module body 102 (shown in FIG. 2) to properly locate the bus bar assembly 120 with respect to the body 102 during fabrication and assembly of the module 100. In an exemplary embodiment, the pins 126 are fabricated from a conductive material according to a known process and coupled to the bus bar 122 in a known manner, such as a press fit and soldered connection.

Figure 3:
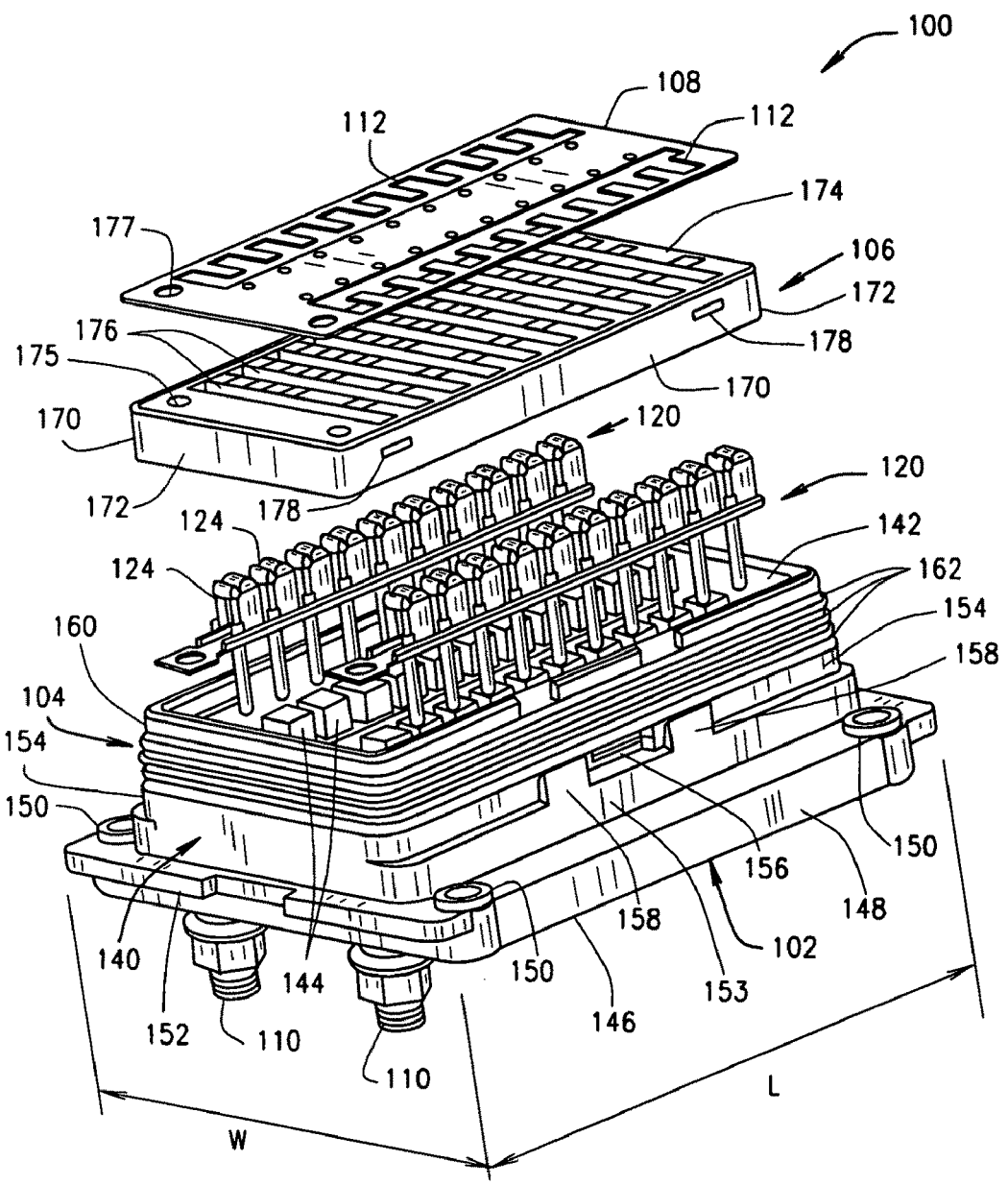
FIG. 3 is an exploded view of the power distribution module shown in FIG. 1.

FIG. 3 is an exploded view of the power distribution module 100 illustrating the body 102, the sealing barrier 104, the grid 106, the grid guide cover 108, and first and second bus bar assemblies 120 in relation to one another.

In an exemplary embodiment, the body 102 is generally rectangular and defines a rectangular terminal compartment 140 having an open ended terminal receptacle 142 on one end thereof. The bus bar assemblies 120 are received in the terminal receptacle 142 of the body 102 and aligned with one another such that the longitudinal axis 129 (FIG. 2) or each of the bus bar assemblies 120 are spaced apart but extend substantially parallel to one another within the terminal compartment 140 and adjacent the longitudinal sides of the terminal compartment 140.

A number of connector receptacles 144 are formed in the body 102 and extend within the terminal receptacle 142 alongside the respective bus bar assemblies 120, and each connector receptacle 144 is located adjacent one of the terminal elements 124 when the bus bar assemblies 120 are installed. Thus, while each terminal element 124 accepts a power input or line-side blade terminal of an overcurrent protection device such as a fuse, the respective connector receptacle 144 receives a power output or load-side blade terminal of the overcurrent protection device. The connector receptacles 144 extend through a bottom surface 146 of the body 102 and are in communication with the terminal receptacle 142, such that plug-in connectors may be inserted through the bottom of the connector receptacles 144 to mechanically and electrically connect with the load-side terminal blades of a fuse, for instance. For example, a number of Series 280 Packard Metri-Pack™ connectors which are commercially available from Delphi/Packard Electrical Systems of Troy, Mich. may be employed to connect load-side terminals of an overcurrent protection device to output wires or cables connected to electrical components, circuitry, or equipment in the vehicle. Load-side or power output connections to the module 100 may therefore be established conveniently and quickly with snap-fit engagement. The connectors may be sealed to complement the sealing barrier 104 to moisture-proof the module 100, which can be particularly advantageous in specialty vehicle applications operated in extreme environments. Other connectors may be used in lieu of Metri-Pack™ connectors, however, in alternative embodiments.

The body 102 includes a substantially rectangular mounting flange 148 which extends laterally outward as a ledge from the side walls of the terminal compartment 140. In one embodiment, the mounting flange 148 includes threaded inserts 150 at approximately the four corners of the flange 148. When used with a mounting bracket (not shown), the inserts 150 provide for surface mounting of the module body 102 on, for example, a chassis of a vehicle with known fasteners inserted through the flange 148 and the inserts 150. Additionally, the terminal compartment 148 of the body 102 includes a mounting rim 152 extending laterally outward from the flange 148. The mounting rim 152 may be mounted to a larger panel system using the inserts 150. Thus, the power distribution module 100 may be mounted in either a surface mount configuration or a panel mount configuration to accommodate a variety of electrical systems.

A cover mount ledge 153 extends laterally outward from the longitudinal side walls of the terminal compartment 140, and a latch wall 154 is formed in an outer surface of the terminal compartment 140 adjacent the ledge 153 one each side of the terminal compartment 140. The latch wall 154 is inwardly recessed relative to the ledge 153. That is, the latch wall 154 is positioned closer to an outer surface of the terminal compartment 140 than the ledge 153. The latch wall 154 includes a cover retaining projection 156 which engages the protective cover (not shown in FIG. 3) as explained further below. The cover mount ledge 153 also includes integral supports or buttresses 158 which flank the cover retaining projection 156 on the latch wall 154.

The terminal compartment 142 is formed with a lip 160 on a top edge thereof and surrounding the outer perimeter of the terminal compartment 142, and the lip 160 retains the barrier seal 104 between the latch walls 154 and the lip 160. In an exemplary embodiment, the barrier seal 104 is a resilient compressible material which extends continuously around the upper perimeter of the terminal compartment 142. In one embodiment, the barrier seal 104 is formed as a continuous band of elastic material (e.g., rubber) which is complementary in shape to the perimeter of the terminal compartment 142 (i.e., rectangular in the illustrated embodiment). Further, the barrier seal 104 includes a number of ribs 162 which are compressed by the protective cover as it is installed to the body 102. While the barrier seal 104 is illustrated with three ribs 162 to provide a triple barrier seal, it is contemplated that more or less ribs 162 may be employed in different embodiments to achieve varying degrees of sealing effectiveness.

The grid 106 is substantially rectangular and box-like, and is fabricated from a nonconductive material to include opposite side walls 170, opposite ends walls 172, and a top surface 174 having a number of cutouts or openings 176 extending therethrough. A number of interior grid partitions (not shown in FIG. 3) extend between the side walls 170 and the end walls 172 beneath the top surface 174. When the grid 106 is engaged to the terminal compartment 140, the grid partitions extend between the connector receptacles 144 and the terminal elements 124 in the terminal compartment 142. The side walls 170 of the grid 106 include retaining projections 178 which are snap fit into slots (not shown in FIG. 3) in the interior side walls of the terminal compartment 140. As such, the side walls 170 of the grid 106 are located interior to the terminal compartment 142 once the grid 106 is installed to the body 102, and hence the joint between the grid 106 and the terminal compartment 140 is within the confines of the sealing barrier 104 once the module 100 is assembled. Effective sealing of the module 100 is therefore ensured.

The grid guide cover 108 is fabricated from a nonconductive material in the form of a thin sheet including the overcurrent device openings 112. The grid guide cover 108 overlies the top surface 174 of the grid 106, and the openings 112 align with the openings 176 in the grid 106. The grid 106 includes locating pins or projections 175 which cooperate with retention apertures 177 in the grid guide cover 108 to align the cover 108 on the grid 106. Additionally, the grid guide cover 108 includes graphics or indicia which may be used to direct users to install or replace fuses in the module 100, and in one embodiment the grid guide cover 108 is adhered to the grid 106, although it is appreciated that the grid guide cover 108 may be attached to the grid 106 in another manner in an alternative embodiment.

The module 100 may be manufactured and assembled as follows in one exemplary embodiment. The bus bar assemblies 120 are assembled by installing the pins 126 and the terminal elements 124 to the bus bars 122, and the assemblies 120 are passed through a flux/reflow machine prior to installation into the body 102. The body 102 is molded from a nonconductive material (e.g., plastic) according to a known process, and the input terminals 110 are molded into the body 102. After molding is complete, the bus bar assemblies 120 are inserted into the terminal receptacle 142 and staked onto the terminals 110. The grid 106 is then snapped into the terminal receptacle 142, either before or after the grid guide cover 108 is installed, and the sealing barrier 104 is then installed over the outer perimeter of the terminal compartment 140 of the body 102. The power distribution module 100 is then ready for use as shown in FIG. 1, and as mentioned previously the module 100 may be panel mounted to an electrical system using the mounting flange 148 or surface mounted using an optional mounting bracket (not shown).

Once the power distribution module 100 is assembled, the power input terminals 110 may be coupled to a power source (not shown) such as a vehicle battery. Connectors (not shown), such as those described above, are inserted into the connector receptacles 144 through the bottom surface 146 of the body 102 to establish load-side connections to electrical equipment and circuitry in, for example, a vehicle electrical system. When the input terminals 110 are connected to the power source and the connectors are installed into the receptacles 144, overcurrent protection devices such as fuses may be inserted into the openings 112 in the grid guide cover 108 and through the openings 176 in the grid 106. More specifically, blade terminals of the fuses are inserted through the openings 112 and 176 such that one of the blade terminals of each fuse engages one of the contact blades 130 of the bus bar assemblies 120 and the other of the blade terminals of each fuse engages an electrical contact of one of the connectors in the corresponding connector receptacle 144. Because the blade contacts 130 are electrically connected to the respective buses 122 and the input terminals 110, each fuse completes a circuit between the power source and the associated load-side equipment and circuitry.

In accordance with known fuses, each fuse includes a fusible links or fuse elements extending between the blade terminals of the fuse, and when electrical current through the fuse exceeds a predetermined limit, the fusible elements melt and opens the circuit through the fuse to prevent electrical damage to the load-side electrical components and circuitry connected to the power distribution module 100. Overcurrent protection for power outputs is therefore provided. Alternatively, overcurrent protection may be provided with known plug-in circuit breaker products which are commercially available.

Figure 4:
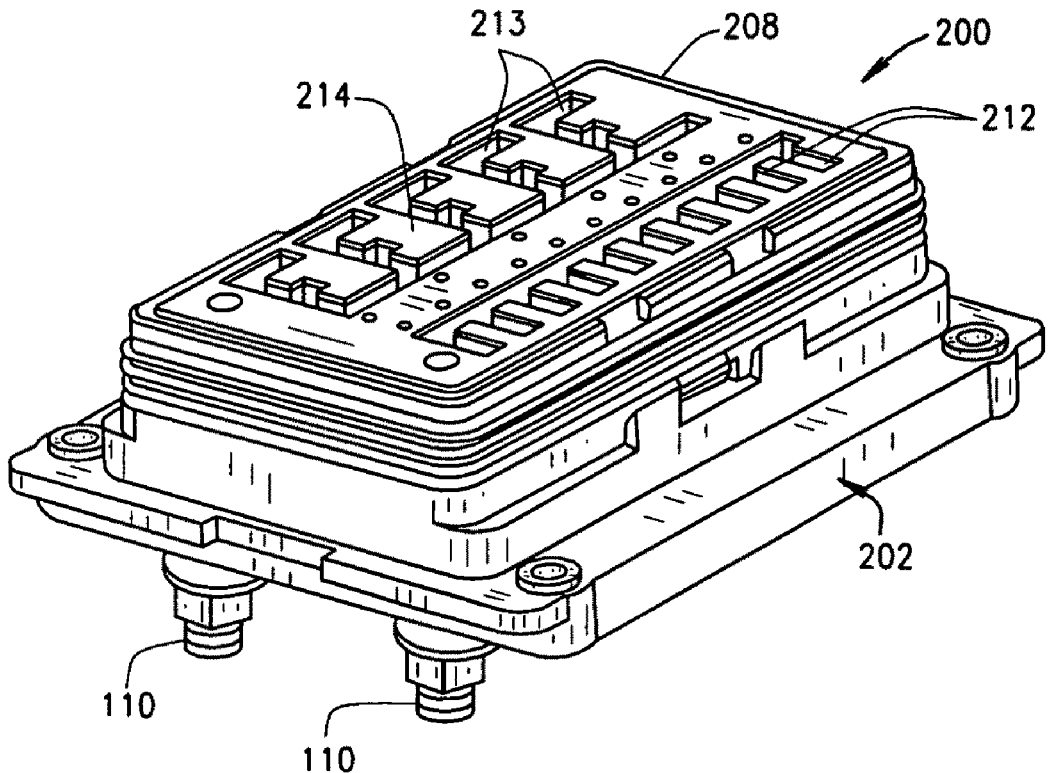
FIG. 4 illustrates another embodiment of an exemplary power distribution module.

FIG. 4 illustrates another embodiment of a power distribution module 200 which may be used in addition to or in lieu of the power distribution module 100 described above. Like the power distribution module 100, the module 200 is provided in a compact size while providing a high component density for power distribution, and the module 200 may be employed for primary or secondary or auxiliary power distribution. The module 200 may be provided at relatively low cost while facilitating convenient connection to external circuitry, and the module 200 may be suitably sealed with to withstand moisture, contaminant exposure, and vibration in use. Unlike the module 100, however, the module 200 may accommodate switching elements or switching devices as explained below.

The power distribution module 200 includes a nonconductive housing base or body 202, the barrier seal 104 as described above, a nonconductive terminal element tray or fuse grid 206 coupled to the body 202, and a grid guide cover 208 overlying the grid 206. A pair of power-input or line-side input terminals 110 extend from the body 202 and are connected, respectively, to internal buses (not shown in FIG. 4 but described below) within the body 202. In an exemplary embodiment, the line-side input terminals 110 are threaded terminal studs for increased current capacity relative to other types of terminals. It is understood, however, that other types of line-side input terminals may be employed in alternative embodiments of the invention in lieu of terminal studs.

The grid 206 and the grid guide cover 208 each include a number of overcurrent device openings or apertures 212 extending therethrough, and each of the openings 212 is dimensioned to receive, for example, a fuse, circuit breaker or other overcurrent protection device (not shown) therein. Additionally, switch element openings 213 are provided in the grid 206 and grid guide cover 208, and the switch element openings 213 are each dimensioned to receive, in one embodiment, a known relay switch package for switching power outputs from the module 200. The switch element 213 openings are accordingly sized and dimensioned differently from the overcurrent device openings 212. Once the bus bar assemblies 120 and 220 are installed, the overcurrent protection devices are electrically connected to one of the power input terminals 110, and the switching elements are electrically connected to the other of the power input terminals 110. Alternatively, the switching elements may be electrically connected to ground using one of the terminals 110.

As illustrated in FIG. 4, the overcurrent device openings 212 are aligned with one another on a top surface 214 of the grid guide cover 208, and the switch element opening 213 are aligned with one another on the top surface 214. In an exemplary embodiment, the grid 206 and the guide cover 208 include ten overcurrent device openings 212 one side of the top surface 214, and five switch element openings 213 on the other side of the top surface 214. It is understood however, that a greater or lesser number of overcurrent device openings 212 and switch element openings 213 could be provided in another embodiment, and the overcurrent device openings 212 and fuse element openings 213 could be arranged on the top surface 214 differently than FIG. 4 illustrates. In an exemplary embodiment, and like the module 100 described above, the power distribution module 200 has a length L of approximately 113 mm and a width W of approximately 85 mm. The module 200 therefore accommodates a selected combination of overcurrent protection devices and switching elements in a compact size with relatively high component density. It is contemplated, however, that the dimensions of the module 200 may vary in alternative embodiments.

Figure 5:
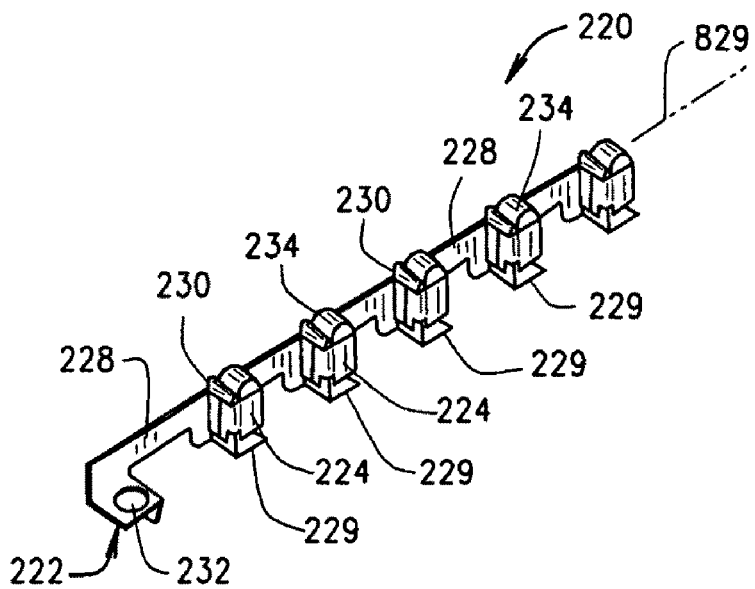
FIG. 5 illustrates a switching bus bar assembly for the power distribution module shown in FIG. 4.

FIG. 5 illustrates an exemplary switching bus bar assembly 220 for the module 200 (shown in FIG. 4) including a conductive bus bar 222 and terminal elements 224 connected to the bus bar 222. The bus bar 222 includes a flat or generally planar region 228 which is elongated and extends along a longitudinal axis 229 of the bus bar 222. Along the axis 229 of the bus bar 222, contact tabs 229 extend substantially perpendicular to the planar region 228, and upstanding contact blades 230 are formed in the contact tabs 229 and extend substantially perpendicular to the contact tabs 229 and also generally perpendicular to the planar region 228. As illustrated in FIG. 5, the contact tabs 229 lie in first plane which is perpendicular to the plane of the planar region 228 connecting the contact tabs 229, while the contact blades 230 extend generally parallel to and spaced from one another along the axis 229.

An aperture 232 is formed in the bus bar 222 at one end of the bus bar 222, and the aperture 232 receives one of the power input terminals 110 (shown in FIG. 4) to mechanically and electrically connect the power input terminal 110 to the bus bar 222. The bus bar 222 is fabricated from a sheet of conductive material according to a known stamping and forming process, or other fabrication processes familiar to those in the art.

In an exemplary embodiment, the terminal elements 224 are known resilient or spring terminals which engage the upstanding contact blades 230 of the bus bar 222 on one end and receive a switch contact (not shown) of, for example, a relay package. The terminal elements 224 each include a resilient or deflectable contact arm 234, and when the switch contact is inserted between the respective contact arms 234 of the terminal elements 224 and the contact blade 230 of the bus bar 222, the contact arm 234 clamps the switch contact to the respective contact blade 230 of the bus bar 222. The terminal elements 224 are fabricated from a sheet of conductive material in an illustrative embodiment according to a known stamping and forming process, or other fabrication processes familiar to those in the art. In alternative embodiments, the terminal elements 224 may be fabricated from nonconductive materials if desired. It is understood that the terminal elements 224 could be formed into a variety of shapes using a variety of materials in various alternative embodiments.

In one embodiment, the contact blades 230 of the bus bar 222 and the attached terminal elements 224 are uniformly spaced from one another and configured to accept, for example, 2.80 mm wide terminal blades of known commercially available relay switch packages. Thus, the bus bar assembly 220 is particularly well suited for relay switch packages commonly used in vehicle applications. It is understood, however, that the contact blades 230 and the terminal elements 224 could be otherwise constructed to accept other types of switching elements in lieu of relay switches. Additionally, while the illustrative bus bar assembly 220 of FIG. 5 includes five contact blades 230 and five terminal elements 224, it is appreciated that greater or fewer numbers of contact blades 230 and terminal elements 224 may be employed in alternative embodiments.

Figure 6:
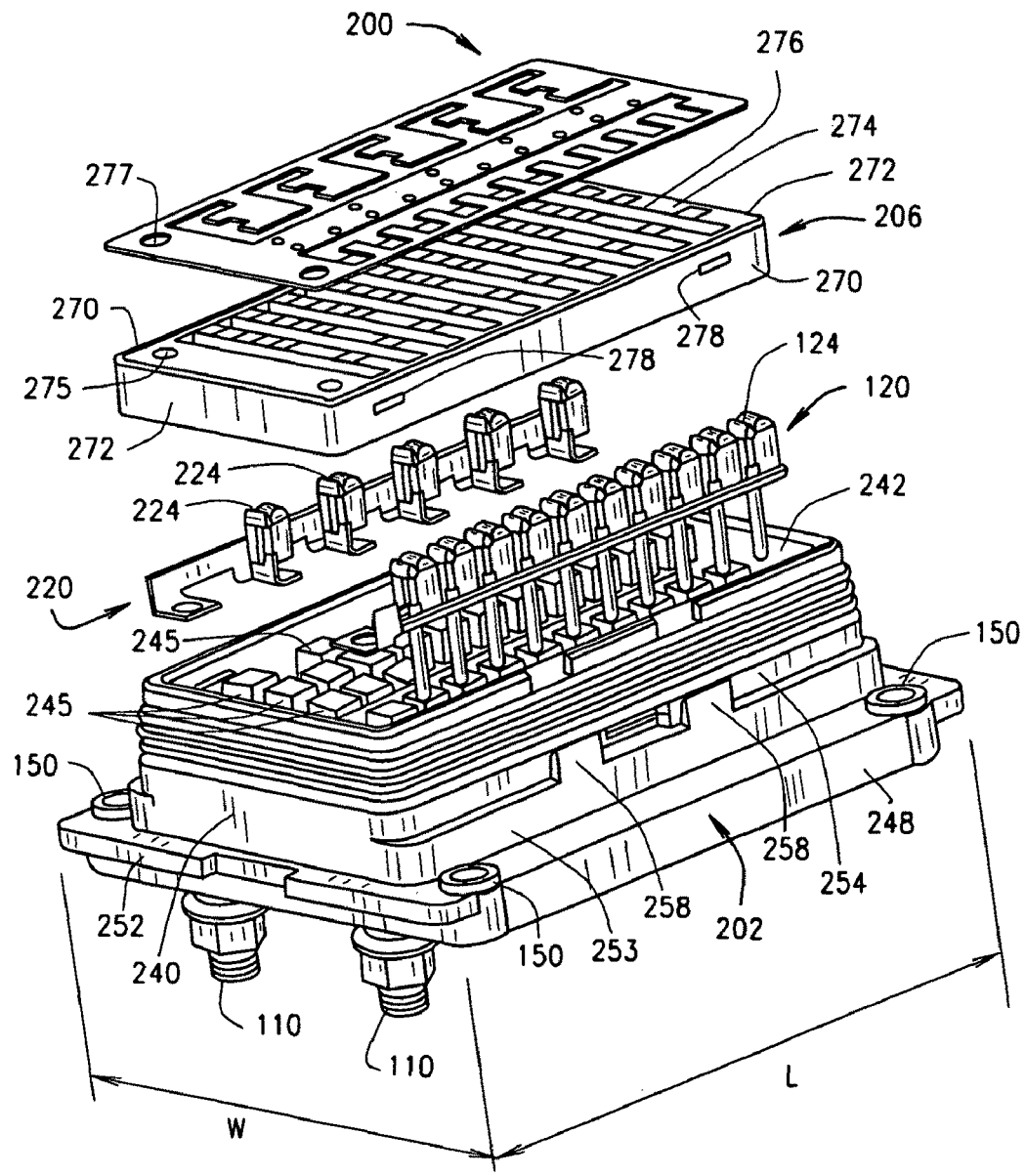
FIG. 6 is an exploded view of the power distribution module shown in FIG. 4.

FIG. 6 is an exploded view of the module 300 illustrating the body 202, the sealing barrier 104, the grid 206, the grid guide cover 208, one bus bar assembly 120 (described above in relation to FIG. 3) and one bus bar assembly 220 (FIG. 5).

In an exemplary embodiment, the body 202 is generally rectangular and defines a rectangular terminal compartment 240 having an open ended terminal receptacle 242 on one end thereof. The bus bar assemblies 120 and 220 are received in the terminal compartment 242 of the body 202 such that the longitudinal axis 129 (FIG. 2) and 229 (FIG. 5) or the respective bus bar assemblies 120 and 220 are spaced apart but extend substantially parallel to one another within the terminal compartment 240.

A number of fuse output connector receptacles 144 are formed in the body 202 and extend within the terminal receptacle 242 alongside the fuse bus bar assembly 120 in the manner described above in relation to FIG. 3. Each terminal element 124 of the bus bar assembly 120 accepts a line-side blade terminal of an overcurrent protection device such as a fuse, and the respective connector receptacle 144 receives a load-side blade terminal of the fuse. Known plug-in connectors may be inserted through the bottom of the connector receptacles 144 to mechanically and electrically connect with the load-side terminal blades of the fuses. In particular, Series 280 Packard Metri-Pack™ connectors coupled to an output wire or cable connected to electrical components, circuitry, or equipment in the vehicle may be used. Load-side or power output connections to fuses in the module 200 may therefore be established conveniently and quickly with snap-fit engagement. Sealed connectors may be employed to complement the sealing barrier 104 to moisture-proof the module 200 for demanding operating environments of specialty vehicles. Other connectors may be used in lieu of Metri-Pack™ connectors, however, in alternative embodiments.

Additionally, a number of switch output connector receptacles 245 are formed in the body 202 and extend within the terminal receptacle 242 alongside the switching bus bar assembly 220. Each terminal element 224 of the bus bar assembly 220 accepts a power input or line-side contact of the relay switch package, and the respective connector receptacles 245 receives power output and switching control contacts for the relay switch package. Known plug-in connectors may be inserted through the bottom of the connector receptacles 245 to mechanically and electrically connect the relay switch package control inputs and power outputs. In particular, Series 280 Packard Metri-Pack™ connectors may be used. Connections to relay switch packages in the module 200 may therefore be established conveniently and quickly with snap-fit engagement. The connectors may be sealed to complement the sealing barrier 104 to moisture-proof the module 200.

The body 202 includes a mounting flange 248 which extends laterally outward as a ledge from the terminal compartment 240. In one embodiment, the mounting flange 248 includes threaded inserts 150 at approximately the four corners of the flange 248. When used with a mounting bracket (not shown), the inserts 150 provide for surface mounting of the module body 102 on, for example, a chassis of a vehicle with known fasteners. Additionally, the terminal compartment 248 of the body 202 includes a mounting rim 252 which may be engaged to a larger panel system (not shown) in a known manner. Thus, the panel 200 may be mounted in either a surface mount configuration or a panel mount configuration to accommodate a variety of electrical systems.

A cover mount ledge 253 is formed on a lower outer surface of the terminal compartment 240, and a latch wall 254 is formed in the body 202 adjacent the cover mount ledge 253 on each side of the terminal compartment 240. The latch wall 254 is inwardly recessed relative to the cover mount ledge 253. That is, the latch wall 254 is positioned closer to an outer surface of the terminal compartment 240 than the cover mount ledge 253. The latch wall 254 includes a cover retaining projection 256 on each side of the terminal compartment 240 which engage the protective cover (not shown in FIG. 6) as explained further below. The cover mount ledge 253 also includes integral supports or buttresses 258 which flank the cover retaining projection 256 on the latch wall 254.

The terminal compartment 240 is formed with a lip 260 on a top edge thereof and surrounding the terminal compartment 240, and the lip 260 retains the barrier seal 104 between the latch walls 254 and the lip 260.

The grid 206 is substantially rectangular and box-like, and is fabricated from a nonconductive material to include opposite side walls 270, opposite ends walls 272, and a top surface 274 having a number of cutouts or openings 276 extending therethrough. A number of interior grid partitions (not shown in FIG. 6) extend between the side walls 270 and the end walls 272 beneath the top surface 274. When the grid 206 is engaged to the terminal compartment 240, the grid partitions extend between the connector receptacles 244 and the terminal elements 224 in the terminal compartment 242. The side walls 270 of the grid 206 include retaining projections 278 which are snap fit into slots (not shown in FIG. 6) in the terminal compartment 240 when the grid 206 is slid downward into the terminal receptacle 242 over the bus bar assemblies 120 and 220. Notably, the side walls 270 of the grid 206 are located interior to the terminal compartment 242 once the grid 206 is installed, and hence the joint between the grid 206 and the terminal compartment 240 is within the confines of the sealing barrier 204 once the module 200 is assembled. Effective sealing of the module 200 is therefore ensured in a top end of the power distribution module 200. Sealed terminals, plug connectors and the like may be used on the bottom end of the module 200 to seal the bottom surface of the module 200, and when so employed the module 200 is well suited for demanding operating environments of specialty vehicles.

The grid guide cover 208 is fabricated from a nonconductive material in the form a thin sheet including the overcurrent device openings 212 and the switch element openings 213. The grid guide cover 208 overlies the top surface 274 of the grid 206, and the openings 212 and 213 align with the openings 276 in the grid 206. The grid 206 includes locating pins or projections 275 which cooperate with retention apertures 277 in the grid guide cover 208 to align the cover 208 on the grid 206. The grid guide cover 208 includes reference graphics or indicia which may facilitate install or remove of overcurrent protection devices (e.g., fuses or circuit breakers) and switching devices in the module 200. In one embodiment the grid guide cover 208 is adhered to the grid 206, although it is appreciated that the grid guide cover 208 may be attached to the grid 206 in another manner in an alternative embodiment.

The module 200 may be manufactured and assembled as follows in one exemplary embodiment. The bus bar assemblies 120 and 220 are assembled and the assemblies 120 and 220 are passed through a flux/reflow machine prior to installation into the body 202. The body 202 is molded from a non-conductive material (e.g., plastic) according to a known process, and the input terminals 110 are molded into the body 202. After molding is complete, the bus bar assemblies 120 and 220 are inserted into the terminal receptacle 242 and staked onto the respective terminals 110. The grid 206 is then snapped into the terminal receptacle 242, either before or after the grid guide cover 208 is installed, and the sealing barrier 104 is then installed over the outer perimeter of the terminal compartment 240 of the body 202. The module 200 is then ready for use as shown in FIG. 4, and as mentioned previously may be surface mounted or panel mounted to an electrical system.

Once the module 200 is assembled, the input terminal 110 corresponding to the fuse bus bar assembly 120 (FIG. 6) may be coupled to a power source (not shown) such as a vehicle battery. The other terminal 110 corresponding to the switching bus bar assembly 220 (FIG. 6) may be coupled to a power source or to ground as desired. Fuse output connectors (not shown) are inserted into the connector receptacles 244 through the bottom surface 246 of the body 202 to establish fused output or load-side connections to electrical equipment and circuitry in, for example, a vehicle electrical system. When the input terminal 110 for the fuse bus bar assembly 110 is connected to the power source and the connectors are installed into the receptacles 144, fuses may be inserted into the openings 212 in the grid guide cover 208 and through the openings 276 in the grid 206. Blade terminals of the fuses are inserted through the openings 212 and 276 such that one of the blade terminals of each fuse engages one of the contact blades 130 (FIG. 2) and the other of the blade terminals of each fuse engages an electrical contact of one of the connectors in the corresponding connector receptacle 144. Because the contact blades 130 are electrically connected to the bus 122 and one of the input terminals 110, each fuse completes a circuit between the power source and the associated load-side equipment and circuitry. In an alternative embodiment, circuit breakers may be used in lieu of fuses.

Switch output and control connectors (not shown) are inserted into the switch connector receptacles 245 through the bottom surface 246 of the body 202 to establish switch control and switch output or load-side connections to electrical equipment and circuitry in, for example, a vehicle electrical system. When the input terminal 110 of the switch bus bar assembly is connected to the power source and the connectors are installed into the receptacles 245, the relay switch packages may be inserted into the switch openings 213 in the grid guide cover 208 and through the openings 276 in the grid 206. The respective contacts of the switch package are inserted through the openings 213 and 276 to establish electrical contact with the bus bar 222 and control and output circuitry. Because the contact blades 230 of the switching bus bar assembly 220 are electrically connected to the bus 222, each switch package completes a circuit between the power source and the associated load-side equipment and circuitry.

Fused power distribution and switching is therefore conveniently provided in a single, compact package with plug-in connections. The module 200 may also be manufactured and assembled in an economical manner and at lower cost than known power distribution blocks which have integrated overcurrent protection and switching capability. By providing a dedicated bus bar for switching purposes, the switch packages (e.g., relay switches) may be operated independently or simultaneously for user convenience, and further without affecting the fuse bus bar assembly 120 and the fused connections to the module 200.

Figure 7:
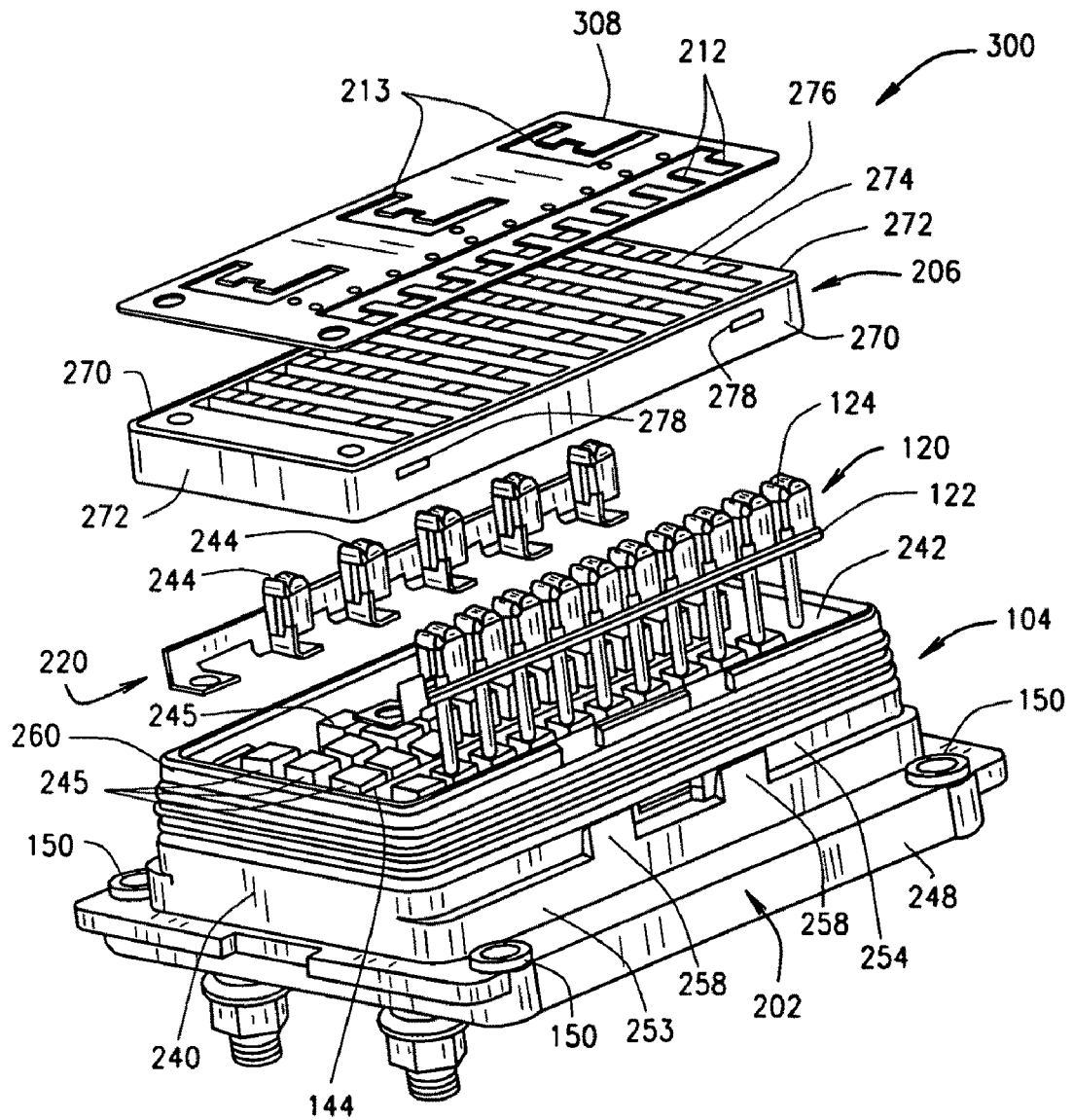
FIG. 7 illustrates another embodiment of a power distribution module.

FIG. 7 is an exploded view of another embodiment of a power distribution module 300 which is similar to the module 200 in most aspects, and in which like reference numbers of the module 200 are indicated with like reference characters in FIG. 7. As may be seen from FIG. 7, the module 300 includes a grid guide cover 308 which includes a fewer number of switch openings 213 than the switching terminal elements 224 of the switching bus bar assembly 220. Thus, as shown in FIG. 7, the switching bus bar assembly 220 includes five terminal elements 224 while the grid guide cover 308 includes only three switch element openings 213, and the grid guide cover 308 therefore prevents switching packages from engaging two of the terminal elements 334. In such a manner, different grid guide covers may be used with a standardized internal construction of the module 200 to present different fuse and switch element mounting interfaces for different applications. Thus, power distribution modules can be tailored to different users in a low cost manner by simply changing the grid guide cover 308 to provide different numbers of switch element openings 213 and/or overcurrent device openings 212.

Figure 8:
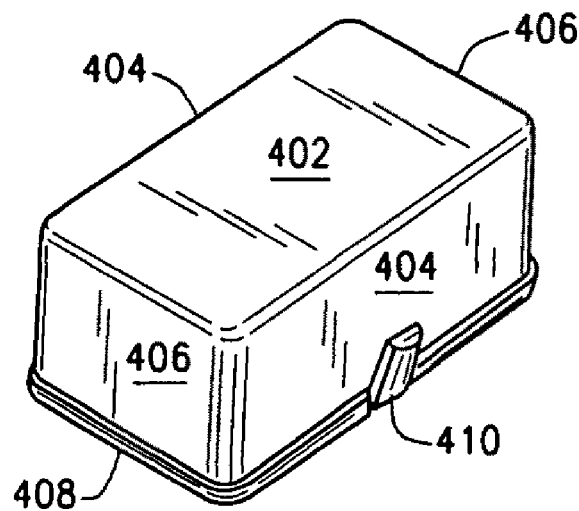
FIG. 8 illustrates a protective cover for the power distribution modules shown in FIGS. 1, 4, and 7.

FIG. 8 illustrates a protective cover 400 which may be used with the foregoing power distribution blocks 100 (FIGS. 1-3), 200 (FIGS. 3-6) and 300 (FIG. 7). The cover 400 is fabricated from a nonconductive material such as plastic, and includes a top wall 402, longitudinal side walls 404 extending downwardly from the top wall 402, and lateral side walls 406 extending downwardly from the top wall 402 and interconnecting the longitudinal side walls 404. The top wall 402 and the side walls 404 and 406 are arranged in a substantially rectangular or box-like shape with a hollow interior sized and dimensioned to receive the terminal compartments 104 (FIG. 3), or 240 (FIGS. 6 and 7) and to form a protective enclosure over fuses and/or relay switch packages in the modules 100, 200 or 300.

A lower periphery of the cover 400 includes an integrally formed sealing rim 408 which extends slightly outward from the outer surfaces of the side walls 402 and 404, and cover latch arms 410 extend from the longitudinal side walls 404, and are approximately equidistant from the lateral side walls 406. In one embodiment, the latch arms 410 are substantially rectangular in shape and extend obliquely to the longitudinal side walls 404 and to the top cover 402. The latch covers 410 are integrally formed into the cover 400 and facilitate engagement and disengagement of the cover 400 from the latch projections 156 (FIG. 3) and the latch projections 256 (FIGS. 6 and 7). In an exemplary embodiment, the cover is fabricated from, for example, plastic, according to a known molding process, and the latches are resiliently deflectable relative to the side walls 404 of the cover 400.

Figure 9:
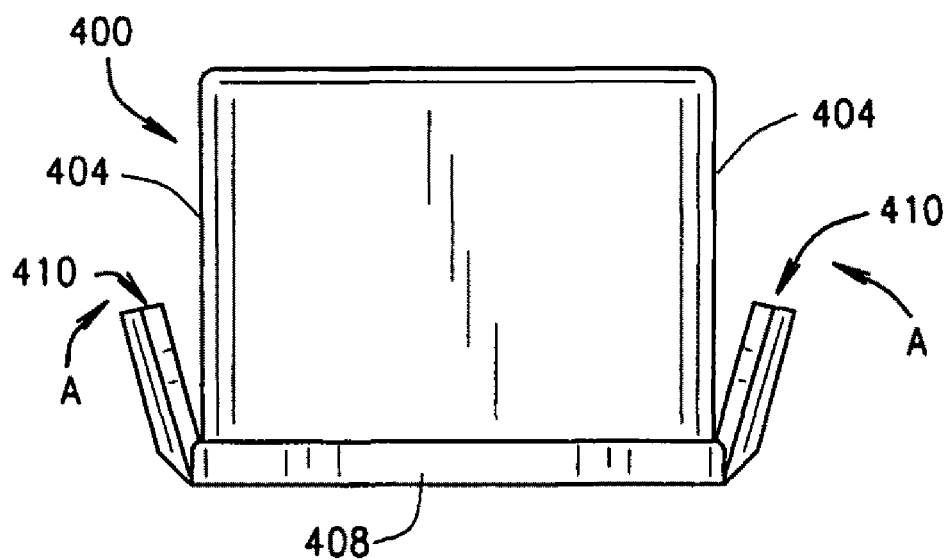
FIG. 9 is an end view of the cover shown in FIG. 8.

FIG. 9 is an end view of the cover 400 illustrating the latch arms 410 extending at an angle to the side walls 404 adjacent the sealing rim 408. When the cover 400 is installed to the modules 100, 200, or 300, the latch arms 410 snap over the latch projections 156 (FIG. 3) and the latch projections 256 (FIGS. 6 and 7), and the sealing rim 408 is received between the latch walls 254 (FIG. 3) and 256 (FIGS. 6 and 7) and the buttresses 158 (FIG. 3) and 258 (FIGS. 6 and 7). The buttresses 158 and 258 retain the cover rim 408 and prevent warping of the cover which could degrade or compromise the integrity of the seal. The sealing barrier 104 (FIGS. 3, 6, and 7) is compressed to form a secure, moisture-proof seal. The latch arms 410 may be compressed in the direction of Arrow A in FIG. 9 to deflect the side walls 404 at the lower edges and remove the cover 400 from the module.

Figure 10:
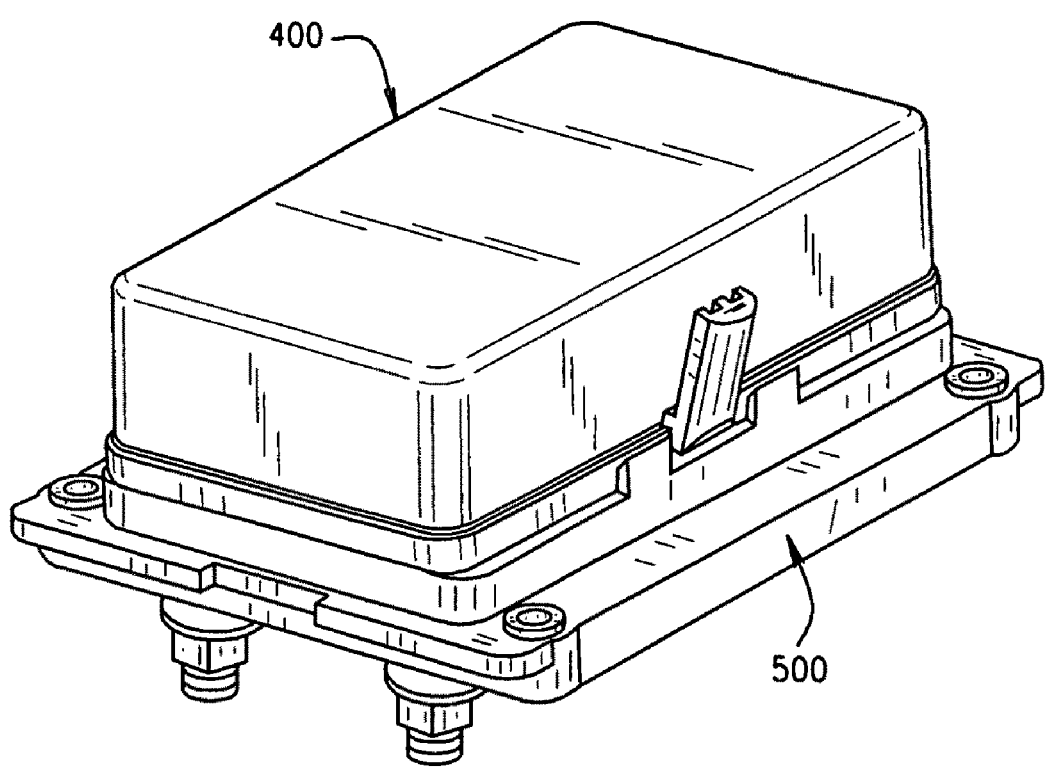
FIG. 10 illustrates the cover shown in FIGS. 8 and 9 attached to a power distribution module.

FIG. 10 illustrates the cover 404 in an installed position on power distribution module 500, which may be any of the foregoing modules 100, 200 or 300. The cover 400 is securely latched to the module 500 and will not easily separate from the module 500. The cover 400 is therefore well suited to withstand vibration which is commonly incurred for, example, in watercraft and construction or agricultural equipment. The barrier seal 104 (FIGS. 1, 3, 4, 6 and 7) provides a triple redundant seal to protect overcurrent protection devices and/or switch packages used in the module 500.

In further alternative embodiment, the above described sealing cover 404 and sealing features in the modules 100, 200 and 300 may be employed in modules without having the above-described internal bus bar assemblies. As such, sealed enclosures may be provided for fuses, switching elements such as relays, circuit breakers, diodes, resistors, and flasher elements, to name a few, which may be employed in, for example, a vehicle electrical system. When used with commercially available sealed terminals and connectors, such a module may be beneficial even without the above-described bus bar assemblies, and may be particularly advantageous when used with specialty vehicles.

Figure 11:
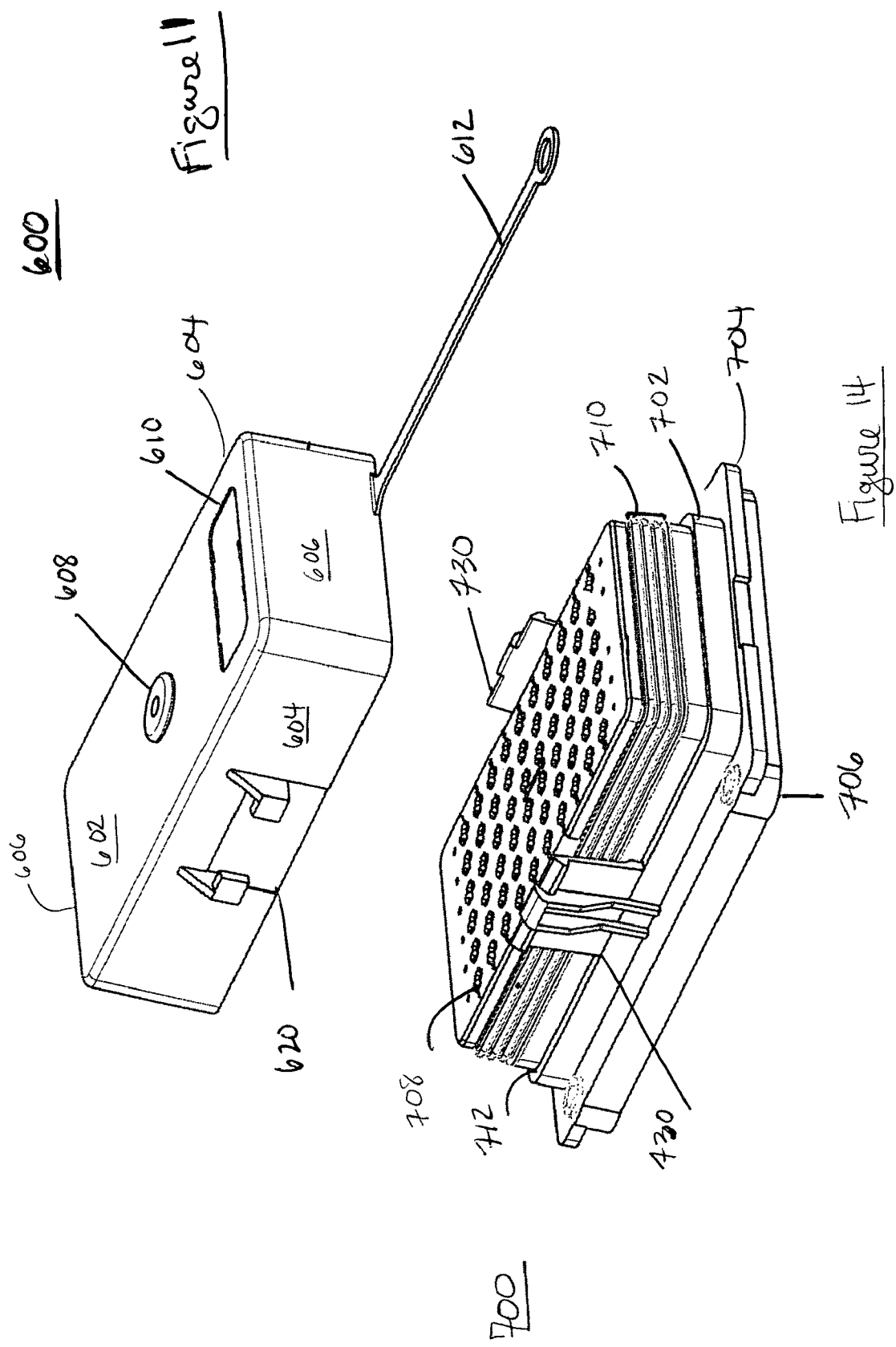
FIG. 11 illustrates an exemplary protective cover for a rear terminal mini fuse and relay panel.

FIG. 11 shows one embodiment of a power distribution module featuring a rear terminal mini fuse and relay panel having a built in latching mechanism for securing the protective cover to the compartment base. The assembly includes a protective cover 600 and compartment base 700. Both the protective cover and base can be fabricated from a nonconductive plastic material, such as for example, plastic, according to known molding processes.

Protective cover 600 is similar to cover 400 described with respect to FIG. 8 and includes a top wall 602, longitudinal side walls 604 extending downwardly from the top wall 602 and lateral side walls 606 extending downwardly from the top wall 602 and interconnecting the lateral side walls 606. The top wall 602 and longitudinal 604 and lateral 606 side walls can be arranged in a substantially rectangular or box-like shape, defining a hollow interior space. The interior space can be sized and dimensioned to receive a compartment base and form a protective enclosure over the contents thereof, such as for example, a fuse and/or relay package. Exemplary embodiments of the base include, but are not limited to, modules 100, 200 or 300, or the like.

The protective cover 600 may include means for releasing pressure, such as for example, a plug 608. The plug 608 may be formed from a variety of materials, preferably including materials which are water resistant. Cover 600 may be molded to include a space for a logo or other visual indicia 610, or may be fabricated with a logo or indicia molded into the cover. Cover 600 may also include a tether 612.

The side wall 604 may include a latch receptacle 620, allowing for attachment of the protective cover 600 to the base portion 700 of the module, wherein the base includes the latch insert 730, which are adapted to engage the latch 620.

Figure 12:
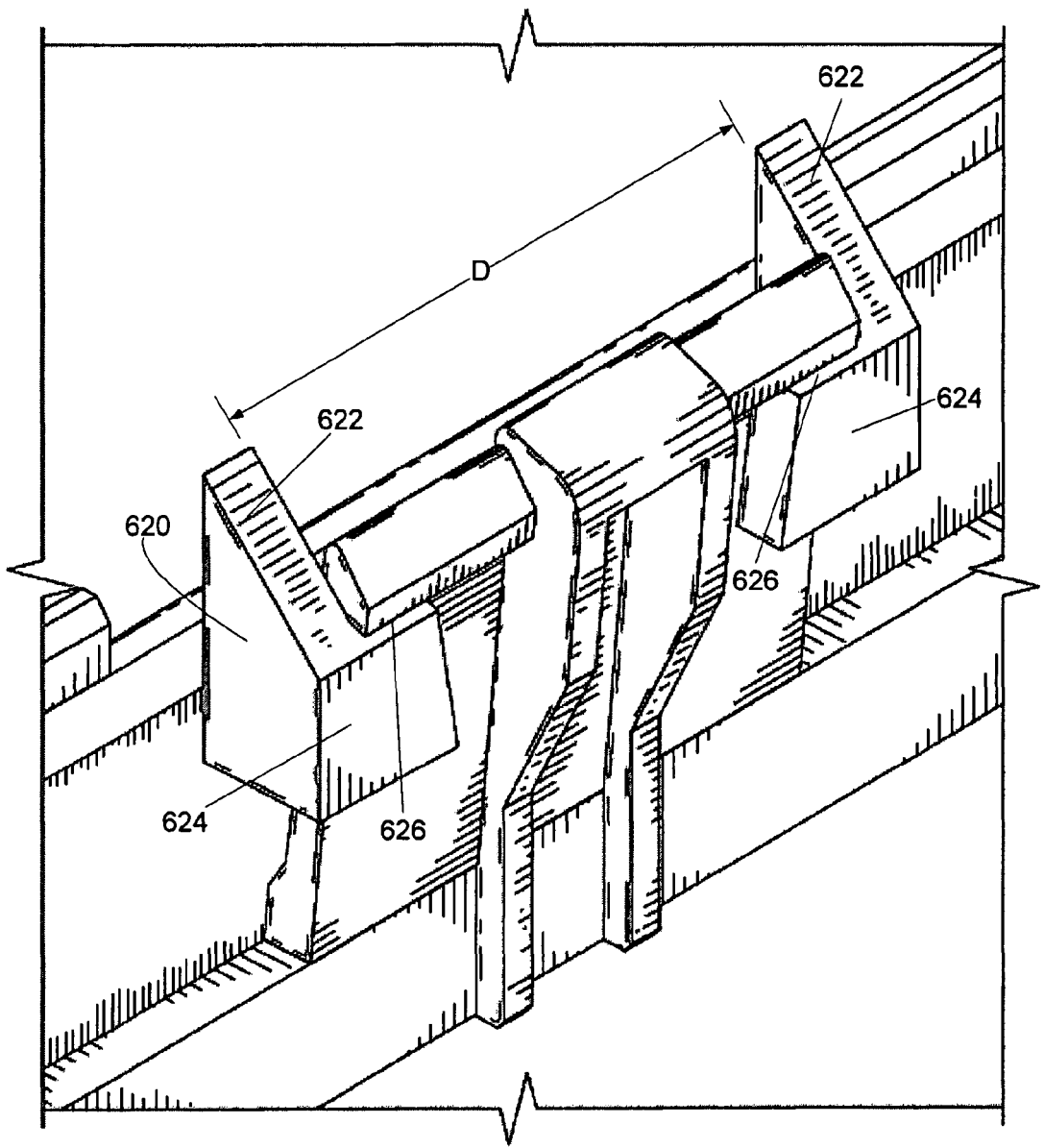
FIG. 12 illustrates an exemplary latching receptacle mechanism for a protective cover.

As shown in FIG. 12, the protective cover 600 of the module includes latch receptacle 620, which acts as the female member of the latching mechanism and is adapted to receive and secure the male counterpart latch insert 730. The latch receptacle 620 consists of two parallel vertical walls 622 which extend outward from the side wall of the protective cover 600, thereby defining a space D between the two walls. The vertical walls 622 each include wall arms or projections 624 which are spaced apart from the surface of the side wall 604 and extend perpendicular to the verticals walls. The wall projections 624 extend inward relative to the opposing vertical walls 622, thereby further defining a space adapted for accommodating the latch insert 730, wherein the space is bounded by the side wall 604, vertical walls 622 and wall arms 624. The latch receptacle projections 624 include ledges 626 which are adapted to receive the latch insert 730 and secure the base to the cover 600.

Figure 13:
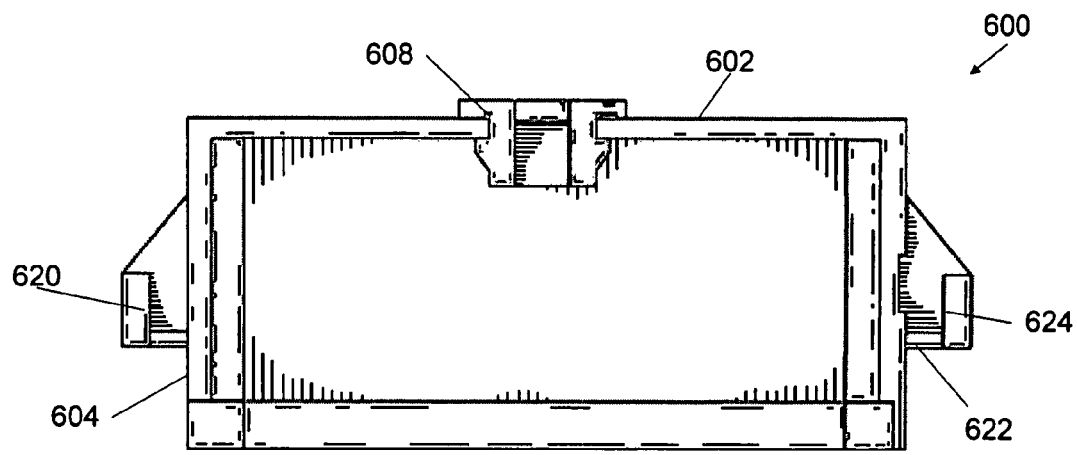
FIG. 13 illustrates a cutaway view of a protective cover for the compartment.

FIG. 13 shows a cross-sectional view of the protective cover 600. As shown, the protective cover 600 can includes a pair of latch receptacles 620 on opposing side walls 604. As shown, the latch receptacle arms 624 are spaced away from the side walls 604, thereby defining a space for receiving and securing the latch inserts 730.

FIG. 14 shows the base of the power distribution module and includes a base 702, a mounting flange 704, a plurality of threaded inserts 706, a terminal grid 708, a gasket 710, a cover mount ledge 712, line side input terminals (not shown, located on the bottom of the module) and a latch insert 730, the male component of the latching mechanism. As shown, the base can include two latch inserts 730, located on opposite sides of the base.

Figure 15:
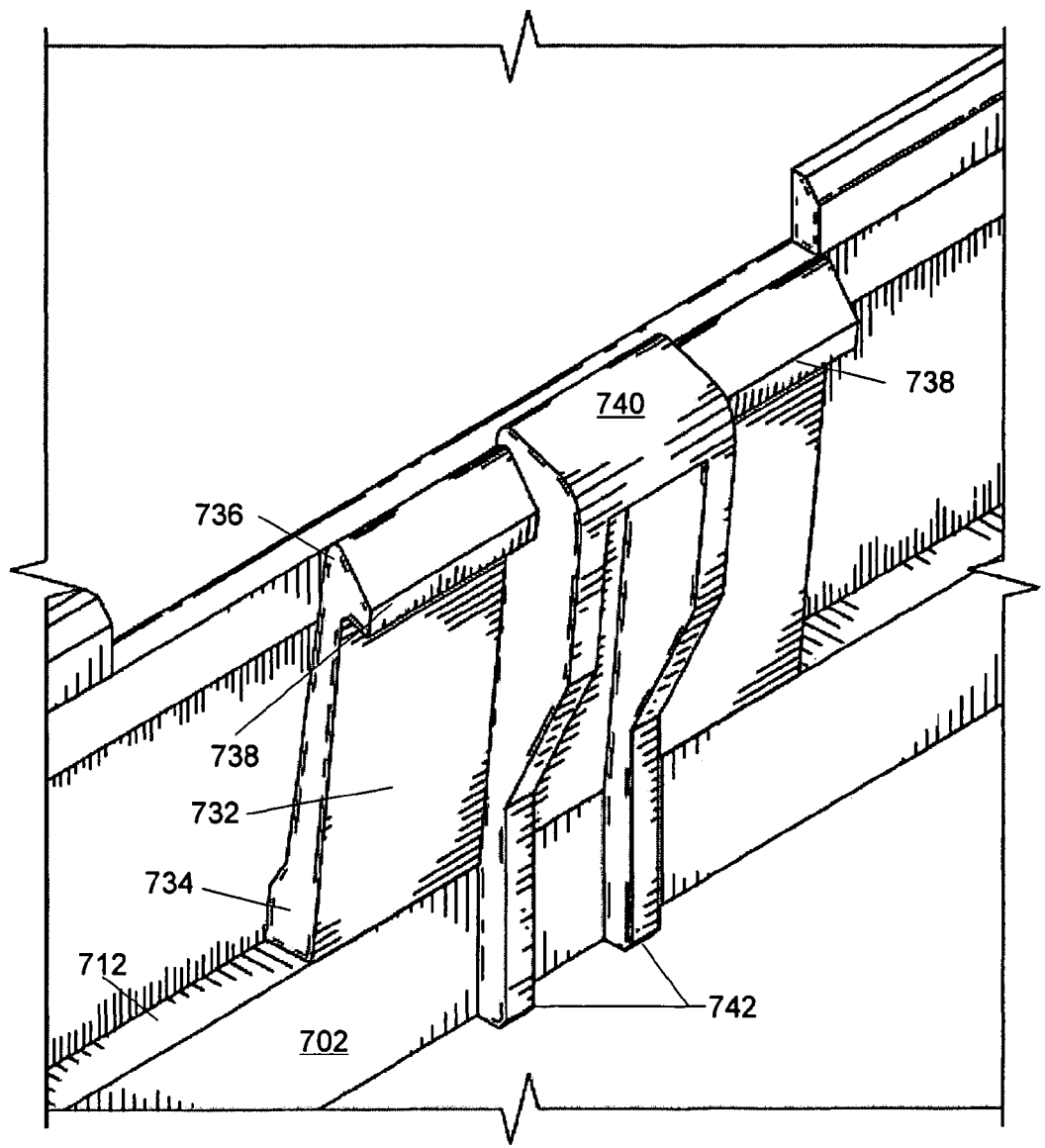
FIG. 15 illustrates an exemplary latching insert for securing a protective cover to a compartment base.

FIG. 15 shows the latch insert 730, which includes of a vertical wall 732 extending upward from the module base 702. The latch insert wall includes a base portion 734 which attaches to the module base 702 and a top portion 736. The top portion 736 of the latch insert 730 includes a curved top and a downward facing lip 738 formed on the exterior surface of the top portion 736 of the latch insert 730, such that when the latch insert 730 is inserted into the latch receptacle 620, the lip 738 can engage the top surface of the latch receptacle projections 624.

The latch insert 730 includes vertical rails 742 on the exterior surface of the latch insert 730, which extend from the module base 702 to the top 736 of the latch insert 730. The rails 742 provide additional support and strength to the latch arm 730, and also provide an outward bias to the latch arm. The top 736 of the latch insert 730 can include a head piece 740 which allows for improved manipulation of the latch insert 730 during installation and removal of the protective cover 600.

The vertical wall 732 of the latch insert is sized to be slid between the vertical walls 622 of the latch receptacle 620. Preferably, the latch insert 730 has a width approximate equal to the distance D between the vertical walls 622 of the latch receptacle 620. The leading portion of the top 736 of the latch arm is sized to be inserted into the space defined by the interior wall of the latch receptacle arms 624 and the side wall 604 of the protective cover 600. The outward bias of the latch insert 730 facilitates engagement of the downward facing lip 738 with the side projection ledge 626.

Figure 16:
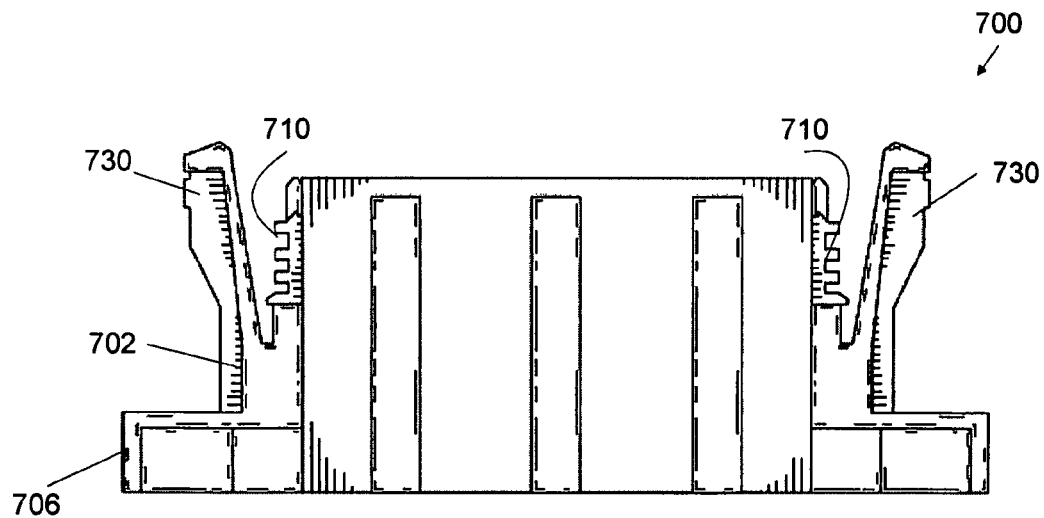
FIG. 16 illustrates a cutaway view of the compartment and latching mechanism.

As shown in FIG. 16, the latch insert 730 is substantially vertical, and outwardly biased from base 702, and when the protective cover is attached, outwardly biased from protective cover 600.

During installation, protective cover 600 is placed over the module base 700. The top of the latch inserts 730 are placed at the bottom of the latch receptacles 620. Downward force is applied to the top wall 602 of the protective cover 600, thereby causing the latch inserts 730 to fully engage the latch receptacles 620, the outward bias of the latch inserts 730 causing the downward facing lip 738 to engage the top ledge of the vertical wall arms 626. The lower edge of the protective cover 600 engages the cover mount ledge 712, and the gasket 710 to form a seal between the cover and base.

Although FIGS. 11-16 illustrate an exemplary latching mechanism for use with a rear terminal mini fuse and relay panel, it is understood that the described latching mechanism may be used in a variety of applications, including each of the power distribution modules described herein. In addition, the described power distribution modules described herein can be used in a variety of vehicles, such as for example, in specialty vehicles, construction and agricultural equipment, marine applications, and truck, bus, and RV applications.

In one aspect, a power distribution module has been described that includes a nonconductive body defining a terminal receptacle and a barrier seal engaged to and surrounding said body adjacent said receptacle on an exterior surface of said body. The receptacle is fitted with a terminal element grid, wherein the grid engaged to said body at a location interior to the barrier seal. The module also includes a protective cover configured to enclose the terminal receptacle and the terminal element grid, wherein the protective cover is secured to the body with a latch and configured to compress said barrier seal.

In one embodiment the module includes a protective cover having a top wall and at least one side wall wherein the latch receptacle integrally is formed with the side wall. In another embodiment, the module includes a latch insert and the cover includes a latch receptacle, wherein the receptacle is adapted to receive the insert, thereby securing the cover to the body. In another embodiment, the latch receptacle includes a plurality of vertical walls which include inwardly facing projections, wherein the projections are perpendicular to the walls, and the combination of vertical walls and projections define a space for receiving said latch insert. In another embodiment, the latch insert is outwardly biased and includes a downward facing lip for engagement with the inwardly facing receptacle arms. In another embodiment, the barrier seal includes a plurality of ribs and is engaged to and surrounding the body, and is compressed by a cover when the cover is engaged to the body. In another embodiment, the body is adapted for surface and panel mounting. In another embodiment, the power distribution module is adapted for use in marine applications. In another embodiment, the power distribution module is adapted or use in a truck, bus, or recreational vehicle (RV). In another embodiment, the power distribution module is adapted for use in an agricultural vehicle.

In another aspect, a power distribution module has been described that includes a nonconductive body defining a terminal receptacle, a sealing means on an exterior surface of the body, a terminal element grid fitted within the receptacle, wherein the grid is engaged to the body at a location interior to said barrier seal, means for enclosing the terminal receptacle and element grid, and means for securing the enclosing means to the body.

In another aspect, a method for producing a power distribution module has been described that includes providing a nonconductive body, wherein the body defines a terminal receptacle, providing a barrier seal which is engaged to and surrounding the body adjacent the receptacle on an exterior surface of the body, providing a terminal element grid fitted within the receptacle, wherein the grid is engaged to the body at a location interior to the barrier seal; and providing a protective cover configured to enclose the terminal receptacle and the terminal element grid, wherein the protective cover is secured to the body with a latch, and the protective cover configured to compress the barrier seal.

In another aspect, a power distribution module has been described that includes a nonconductive body which defines a terminal receptacle, wherein the nonconductive body includes a latch insert. The module also includes a protective cover configured to enclose the terminal receptacle, wherein the cover includes a sealing rim and a latch receptacle on the outer surface thereof, wherein the latch receptacle is adapted to receive the latch insert to secure the protective cover to the body. The module further includes a barrier seal engaged to and surrounding the body adjacent the receptacle on an exterior surface of the body.

In one embodiment, the module the protective cover includes at least one side wall and a latch receptacle integrally formed with the side wall. In another embodiment the latch insert is outwardly biased for engagement with the latch receptacle. In another embodiment, the latch receptacle includes a pair of vertical walls, which include perpendicular projections, wherein the projections in combination with the vertical walls defining a space for receiving the latch insert. In another embodiment, the latch receptacle projections include a ledge and the latch insert includes a lip, wherein the lip is adapted to engage the ledge to secure the cover to the body. In another embodiment, the terminal element grid is configured to receive switching devices and overcurrent protection devices. In another embodiment, the power distribution module is adapted for use in marine applications. In another embodiment, the power distribution module is adapted or use in a truck, bus, or recreational vehicle (RV). In another embodiment, the power distribution module is adapted for use in an agricultural vehicle.

In another aspect, a power distribution module has been described that includes a nonconductive body defining a terminal receptacle, at least one bus bar assembly situated within the terminal receptacle, a barrier seal engaged to and surrounding the body adjacent the receptacle on an exterior surface of the body. The module also includes a protective cover configured to compress the barrier seal around a periphery of the terminal receptacle, wherein the cover includes a latch receptacle and the body includes a latch insert, wherein the latch receptacle is adapted to receive the latch insert to secure the cover to the body. In another embodiment, the module further includes a terminal grid engaged to an interior of the terminal receptacle at a location within the barrier seal. In another embodiment, the protective cover includes a sealing rim. In another embodiment, the module includes switching devices and overcurrent protection devices. In another embodiment, the power distribution module is adapted for use in marine applications. In another embodiment, the power distribution module is adapted or use in a truck, bus, or recreational vehicle (RV). In another embodiment, the power distribution module is adapted for use in an agricultural vehicle.

In another aspect, a power distribution module is described that includes a nonconductive body defining a terminal receptacle, wherein the nonconductive body includes a latch insert. The module also includes a protective cover configured to enclose the terminal receptacle, wherein the cover includes a sealing rim and a latch receptacle on the outer surface. The cover includes a top wall and 4 side walls, and the walls define a space for receiving said body. The latch receptacle is adapted to receive said latch insert to secure the protective cover to the body. The latch receptacle includes a pair of vertical walls, wherein the vertical walls include perpendicular projections, which, in combination with the vertical walls, define a space adapted to receive the latch insert. The module includes a barrier seal engaged to and surrounding the body adjacent the receptacle and on an exterior surface of the body, wherein the protective cover configured to compress said barrier seal. A terminal element grid is fitted within the receptacle, wherein the grid is engaged to the body at a location interior to the barrier seal and the terminal element grid is configured to receive switching devices and overcurrent protection devices.

While the invention has been described in terms of various specific embodiments, those skilled in the art will recognize that the invention can be practiced with modification within the spirit and scope of the claims.

What is claimed is:

1. A power distribution module comprising:
a nonconductive base defining a terminal receptacle;
a protective cover configured to enclose the terminal receptacle, the protective cover comprising a top wall and a plurality of side walls defining a hollow space to receive the terminal receptacle, each of said plurality of side walls including an upper edge joined to the top wall and a lower edge opposite the top wall, at least one of the plurality of side walls being integrally formed with a latch receptacle on an exterior surface thereof, the latch receptacle located between and spaced from each of the upper and lower edges of the at least one sidewall; and
wherein the base includes at least one latch insert cooperating with the latch receptacle to secure said protective cover thereto;
the latch receptacle comprising:
at least one latch wall extending generally perpendicularly from the at least one side wall; and
at least one wall arm extending generally perpendicularly from the at least one latch wall, the at least one wall arm further extending spaced from and generally parallel to the at least one side wall; and
wherein the at least one latch wall and the at least one wall arm collectively define a space to receive and engage a portion of the latch insert between the at least one side wall and the at least one wall arm;
wherein the latch insert comprises a wall extending upwardly from the base and configured to slidably engage said the latch receptacle as the protective cover is installed.

2. The power distribution module of claim 1, wherein the at least one latch wall comprises first and second spaced apart and generally parallel walls projecting outwardly from the at least one side wall.

3. The power distribution module of claim 2, wherein the at least one wall arm comprises first and second wall arms projecting from each respective one of the first and second spaced apart and generally parallel walls, the first and second wall arms extending generally parallel to one another and spaced from the at least one side wall.

4. The power distribution module of claim 3, wherein the first and second spaced apart and generally parallel walls and the first and second wall arms collectively define a space to receive the latch insert therebetween.

5. The power distribution module of claim 3, wherein the first and second wall arms extend generally coplanar to one another and in spaced relationship to the at least one side wall of the protective cover.

6. The power distribution module of claim 5, wherein the first and second wall arms extend toward one another from the respective first and second spaced apart and generally parallel walls.

7. The power distribution module of claim 6, wherein the first and second wall arms include distal ends, the distal ends being spaced from the respective first and second spaced apart and generally parallel walls, and a gap extending between the distal ends of the first and second wall arms.

8. The power distribution module of claim 1, wherein the latch insert wall comprises at least one lip engaging the at least one wall arm when the latch insert is received and secured to the latch receptacle.

9. The power distribution module of claim 8, wherein the at least one wall arm comprises first and second wall arms and the least one lip comprises spaced apart lips, each of the spaced apart lips respectively engaging one of the first and second wall arms when the latch insert is received and secured to the latch receptacle.

10. The power distribution module of claim 9, wherein the latch insert wall further comprises a head piece extending between the spaced apart lips.

11. The power distribution module of claim 1, wherein the latch insert is receivable between the at least one side wall and the at least one wall arm.

12. The power distribution module of claim 11, wherein the latch insert is outwardly biased for engagement with said latch receptacle.

13. The power distribution module of claim 1, wherein the latch receptacle is centrally located on the at least one side wall of the protective cover.

14. The power distribution module of claim 1, wherein the protective cover includes a plurality of latch receptacles and the base includes a plurality of latch inserts.

15. The power distribution module of claim 14, wherein the protective cover includes opposed side walls, and at least one latch receptacle is positioned on each of the opposed side walls of the protective cover.

16. The power distribution module of claim 1, further comprising a barrier seal engaged to and surrounding the base adjacent said terminal receptacle on an exterior surface of said base.

17. The power distribution module of claim 16, wherein the protective cover is configured to compress the barrier seal.

18. The power distribution module of claim 17, further comprising a terminal element grid fitted within said receptacle, the grid engaged to the body at a location interior to the barrier seal.

19. The power distribution module of claim 16, wherein the barrier seal comprises a plurality of ribs.

20. The power distribution module of claim 1, wherein the base is constructed to be mounted in either a surface mount configuration or a panel mount configuration.

21. The power distribution module of claim 1, further comprising a terminal element grid, wherein the terminal element grid is configured to receive switching devices and overcurrent protection devices.

22. The power distribution module of claim 1, further comprising at least one bus bar assembly situated within the terminal receptacle.

23. The power distribution module of claim 1, the cover further comprising a sealing rim.

24. The power distribution module of claim 1, wherein the module is adapted for use in a truck, bus, or recreational vehicle.

* * * * *